United States Patent [19]

Matsuzaki

[11] 3,877,071

[45] Apr. 8, 1975

[54] HEAD POSITIONING MECHANISM FOR TAPE PLAYER

[75] Inventor: Norikazu Matsuzaki, Iwaki, Japan

[73] Assignee: Alps Motorola, Inc., Tokyo, Japan

[22] Filed: May 16, 1973

[21] Appl. No.: 360,769

[30] Foreign Application Priority Data

May 31, 1972 Japan .............................. 47-63953

[52] U.S. Cl. .................... 360/78; 360/93; 360/106; 360/109

[51] Int. Cl. ...................... G11b 21/08; G11b 23/04

[58] Field of Search ................ 360/78, 106, 109, 93

[56] References Cited

UNITED STATES PATENTS

| | | | |
|---|---|---|---|
| 3,575,422 | 4/1971 | Peltz et al. | 360/106 |
| 3,628,796 | 12/1971 | Ban | 360/106 |
| 3,730,532 | 5/1973 | Miyamoto | 360/106 |
| 3,838,456 | 9/1974 | Cayton | 360/78 |

*Primary Examiner*—Stuart N. Hecker

*Attorney, Agent, or Firm*—Mueller, Aichele & Ptak

[57] ABSTRACT

A multi-track magnetic tape player having a cam follower attached to the transducer head engages the stepped face cam surface of a rotatable cam member to position the transducer head to play the alternate pairs of tape tracks. A solenoid device responsive to the completion of the playing of one track of tape is actuated to engage a coupling member mounted to the capstan drive shaft with the cam to rotate the same. A locking device is provided which engages the rotatable cam to prevent rotation thereof and to maintain alignment of the transducer head to the proper tape track upon the completion of the positioning of the transducer head to the next track on the tape.

7 Claims, 4 Drawing Figures

HEAD POSITIONING MECHANISM FOR TAPE PLAYER

BACKGROUND OF THE INVENTION

Multi-track magnetic tape players, such as 8-track tape players, have been very popular for use in automobiles and homes because they provide a relatively high degree of sound fidelity and afford the user many hours of listening pleasure. For example, in an eight-track tape recording for stereophonic sound using the two tracks simultaneously, a reel that contains a one-half hour program along its full length can be played for two full hours on the eight tracks. There have been several prior art devices which have attempted to provide a means wherein the transducer head may be automatically positioned from one tape track to another to continuously play the multi-track tape recordings. In one such system a sensing device operated a solenoid which in turn actuated a ratchet and pawl mechanism to turn a rotatable cam to position the transducer head to the next tape track. In another prior art device, a rotatable cam was driven directly by the capstan drive shaft to position the transducer head to the next tape track. And in still another device, a plurality of gears was suggested to drive the transducer head directly from the capstan drive shaft to position the transducer head to the next tape track.

Importantly, each of these prior art devices contain disadvantages which make their utilization in commercial multi-track tape players less than desirable. In the devices which utilize a solenoid activated device to rotate the cam member, the load to be applied to this large type solenoid is a defect which necessitates complicated construction of the shifting assembly and requires a large capacity power supply for the solenoid. Such undesirable requirements markedly increase the cost and the relative size of the tape player. The mechanical gear and ratchet and pawl systems likewise have not been acceptable because of the relative size and bulk of the unit in which they are utilized, the attendant noise resulting from the switching operation and the increased cost of assembling these mechanical units. Finally in the system which drove the cam directly from the capstan drive, a friction drive was used, which was unreliable in positively stopping the cam at the desired position each time.

SUMMARY OF THE INVENTION

It is one object of this invention to provide an automatic transducer head positioning mechanism for a multi-track magnetic tape player utilizing the capstan shaft as the drive element.

It is another object of this invention to provide an improved automatic transducer head positioning mechanism wherein the transducer head is precisely aligned with the next tape track on the magnetic multi-track tape.

It is still another object of this invention to provide a solenoid activated transducer head positioning mechanism wherein the power requirements of the solenoid are minimized.

Briefly, the present invention relates to an automatic transducer head positioning mechanism for a multi-track magnetic tape player which utilizes the capstan shaft as the drive element. The transducer head is mounted on a displaceable head bracket to which is attached a cam follower which is engageable with a plurality of stepped face cam surfaces of a rotatably mounted cam member each surface which is associated with different tracks on the magnetic tape. The rotatable cam member further contains a plurality of notches on the peripheral edge thereof, each of these notches are positioned to align with each of the stepped face cam surfaces. The cam member is initially rotated by an actuating means responsive to the completion of a playing of one tape on the track which rotates the cam member to a position wherein it is engaged by a coupling member mounted to the capstan drive shaft and is rotated 90° to the next notch on the peripheral edge thereof. When the rotating cam and notch thereon is opposite the coupling member, the rotatable cam is disengaged from the coupling member and a locking device engages one of the notches on the rotatable cam edge and locks the rotatable cam from the coupling member upon the completion of positioning the transducer head to the next track on the tape to positively prevent the cam from further rotation.

DESCRIPTION OF THE INVENTION

Figures 1, 2:
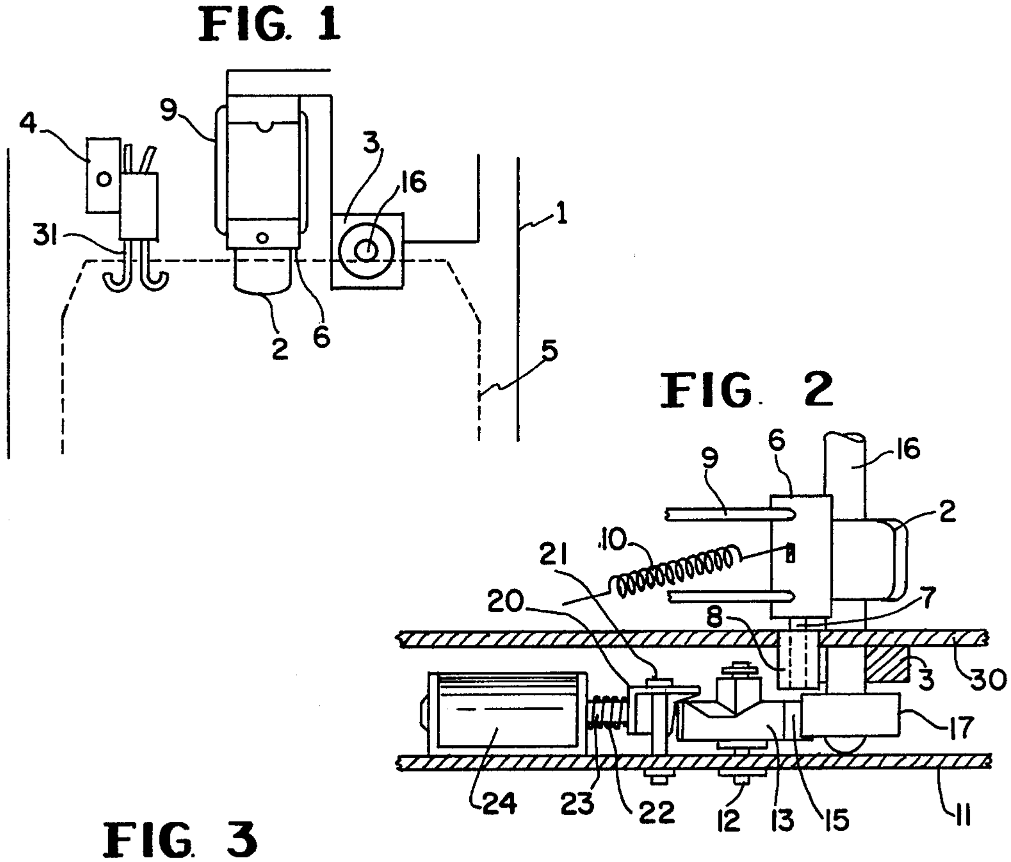
FIG. 1 is a partial plan view of the magnetic tape player of the instant invention.
FIG. 2 is a cross sectional view in elevation of the automatic magnetic head positioning mechanism in accordance with the instant invention.

The transducer head positioning mechanism of the present invention will be described as applied to a multi-track magnetic tape player, but it is understood that the invention may be used in any application requiring a multi-track magnetic tape. In FIGS. 1 and 2, the multi-track magnetic tape player includes a chassis or housing 1 containing a slot or tunnel opening into which a multi-track magnetic tape cartridge 5 is inserted for play, at the position shown in dotted lines. At the end of the tunnel opening, a transducer head 2 is mounted on a support head bracket 6 and the capstan drive shaft 16 is positioned within the capstan housing 3 to urge against the inserted tape of the cartridge 5 to drive the same past the transducer head 2. A detector 31, having two feeler contacts, is provided within the tape player assembly at the end of the tunnel. The two feeler contacts are shorted by a conductive strip on the tape which operates the contact switch 4 which energizes a solenoid 24. In order to provide for vertical adjustment of the transducer head 2 to reproduce the different tracks on the magnetic tape, the head bracket 6 is movably mounted on the tape deck 30 by a pantograph (FIG. 2), a portion of which includes a pair of pivot rods 9. The pair of pivot rods 9 and the capstan housing 3 are integrally joined together and are permitted to move freely up and down.

Figure 4:
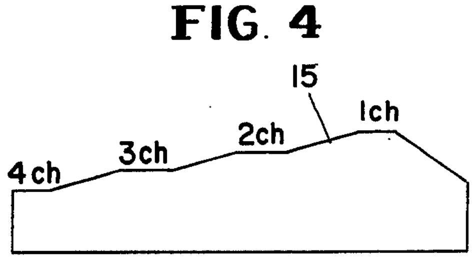
FIG. 4 is a cross sectional view of the stepped face surface of the rotatable cam.

Mounted integrally to the head bracket 6 is a cam follower 7 and a spring 10, which biases the pantograph and therefore the head bracket 6 and the cam follower 7 into contact with the stepped cam surfaces 15 on the rotatable cam 13. The cam follower 7 extends through a sleeve 8 mounted to tape deck 30. The cam 13 is mounted on a shaft 12 anchored to a supplementary tape deck 11 and positioned between the tape deck 30 and the housing 1. The cam is secured to shaft 12 with a preselected space between its bottom surface and the supplementary tape deck 11 so as to permit cam 13 to turn freely. The cam 13 has a plurality of cam surface faces 4 *ch*, 3 *ch*, 2 *ch* and 1 *ch* (FIG. 4), each of which is associated with two tracks on a standard eight-track magnetic tape (assuming that a standard eight-track stereo tape cartridge is to be played by the tape player). In order to rotate the capstan drive shaft 16, a motor (not shown) is engageable with one end of the capstan drive shaft 16 by means of a drive belt and flywheel or other conventional means to drive the same. The capstan drive shaft extends through an opening in the tape deck 30 and has mounted thereabout a ring formed contact or coupling member 17. The coupling member may be constructed of a resilient material having elasticity, for example, rubber or compound resin, or may be constructed of a non-elastic material having tooth marks on its outer peripheral edge thereof, for example, a resin or a metal.

Figure 3:
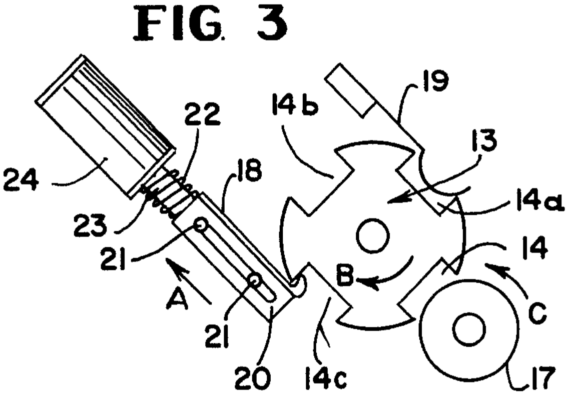
FIG. 3 is a sequential plan view of the rotatable cam, locking device, coupling member and actuating device in accordance with the instant invention.

Now referring to FIG. 3, the rotatable cam 13 has a plurality of notches 14, 14*a*, 14*b* and 14*c* on its outer peripheral edge thereof, which notches are so positioned to correspond to the number of cam surfaces 1 *ch*, 2 *ch*, 3 *ch* and 4 *ch* (FIG. 4), each of which is associated with two different sets of tracks or channels on the magnetic tape. The notches 14, 14*a*, 14*b*, and 14*c* are of a width such that when the coupling member 17 is located opposite to one of the notches, it may rotate freely on capstan shaft 16 without contacting cam 13.

In order to actuate the rotatable cam 13 so that it may be engaged by coupling member 17, a resilient lever 18 having a hook thereon is mounted to a sliding panel 20 positioned on a shaft 21 projecting from the supplementary tape deck 11. One end of the sliding panel 20 is attached to a magnetic armature 22 which is inserted into an electromagnetic coil or solenoid 24. The magnetic armature 33 is inserted within a spring 23 which is biased outwardly from the solenoid such that when the solenoid is energized, the spring restores the control lever, sliding panel and armature to their unactuated position. Mounted integral to the supplementary tape deck is a resilient locking device or member 19 which is positioned to be engageable with the notches on the peripheral edge of the rotatable cam 13 for positively locking the rotatable cam from the coupling member 17 on the capstan drive shaft upon the completion of positioning the transducer head to the next track on the tape. Preferably, the locking device is of a leaf spring construction such that it will engage a notch on the cam 13 and fixedly retain the cam and transducer head 2 in aligned playing position. However, the amount of tension applied by the leaf spring to the cam 13 cannot exceed the inertia imparted by the solenoid to lever 18 to initiate the rotation of the cam so that it may be engaged and driven by the coupling member 17.

The operation of the transducer head positioning mechanism is best understood by reference to FIG. 3. In its unactuated condition, control lever 18 is engageable with notch 14*c* on cam 13 and locking device 19 is engageable with notch 14*a* on cam 13 to hold the cam and attendant notch 14 free from contacting coupling member 17. Assuming the cartridge 5 has been inserted into the housing 1 against capstan 16, when the tape reaches the end of the tape playing period, a conducting metal coil attached to the end of the track shorts the contactor to operate the contact switch which energizes the solenoid 24. When the solenoid 24 is energized, the armature 22 is attracted towards the solenoid thereby pulling sliding panel 20 and the attached control lever 18. As the control lever 18 moves in the A direction, the hook on control lever 18 engages the edge of notch 14c thereby initially rotating cam 13 in a clockwise or B direction. Simultaneously, the coupling member 17 is being rotated by the capstan shaft in a C direction, and the coupling member engages the peripheral edge of cam 13 thereby rotating cam 13 in a B direction until the notch 14 *a* is opposite the coupling member 17 and the coupling member is disengaged. Because notch 14*b* has also been rotated 90° towards locking device 19, the locking device engages notch 14*b* to precisely position the rotatable cam to coincide with the next tape track. During this 90° rotation of cam 13, the cam follower 7 which is in engagement with the cam surface 15, will move, for example, from the 4 ch stepped cam surface to the 3 ch stepped cam surface level. When such movement of the cam follower occurs, the transducer head 2 is shifted to the next tape track on the multi-track magnetic tape. Thus, for each 90° rotation of cam 13, the transducer head will be shifted to align with the next tape track.

In the instant invention, because the solenoid is not utilized as the drive source for cam 13, the solenoid is of a type smaller in power than those normally used in tape players. Thus, the reduced size of the solenoid 24 necessary to actuate the movement of the cam 13 permits a simplified construction of the transducer head positioning mechanism.

I claim:

1. In a transducer head positioning mechanism for a multi-track magnetic tape player having a capstan drive shaft positioned to frictionally engage the multi-track tape to drive the same and a transducer head positioned adjacent the multi-track tape, the combination including, a coupling member driven by the capstan drive shaft, a rotatable cam having a plurality of stepped cam surfaces thereon each of which is associated with different tracks on the magnetic tape, said rotatable cam further having a plurality of notches on the peripheral edge thereof, each of said notches positioned to align with each of said cam surfaces, said peripheral edge of said rotatable cam positioned in a spaced relation to the capstan drive shaft for engagement with said coupling member driven by the capstan drive shaft, cam follower means mounted to the transducer head and engageable with said stepped cam surface for positioning the transducer head to the different tracks on the tape, a locking device engageable with one of said notches positioned on said peripheral edge of said rotatable cam for positively locking said rotatable cam from engaging said coupling member on the capstan drive shaft upon the completion of positioning the transducer head to the next track on the tape to thereby prevent the rotation of said rotatable cam, and actuating means responsive to the completion of the playing of one track on the tape engageable with one of said notches on said rotatable cam to rotate said cam, said rotational movement thereby disengaging said locking device from one of said notches on said rotatable cam and causing said rotatable cam to be engaged and rotated by said coupling member driven by the capstan drive shaft to position the transducer head to the next track on the tape.

2. The transducer head positioning mechanism according to claim 1 wherein said locking device includes a resilient leaf spring engageable with one of said notches.

3. The transducer head positioning mechanism according to claim 1 wherein said actuating means includes a solenoid, a control lever adapted to engage a notch on the rotatable cam and magnetic linkage means coupled to said control lever, said solenoid operating to move said magnetic linkage means to cause said control lever to engage said rotatable cam to disengage the same from the locking device.

4. The transducer head positioning mechanism according to claim 3 further including switch means, said switch means operating to energize the solenoid to cause the same to move said magnetic linkage means.

5. The transducer head positioning mechanism according to claim 4 wherein said switch means includes a switch and a contactor, said contactor positioned to be actuated by said multi-track tape to cause said switch to complete the electrical circuit.

6. The transducer head positioning mechanism according to claim 1 wherein said coupling member comprises rubber.

7. The transducer head positioning mechanism according to claim 1 wherein each of said notches on the peripheral edge of said rotatable cam are positioned at 90° angles with respect to each other such that for each 90° rotation of said rotatable cam, the transducer head is shifted to the next track on the tape.

* * * * *